United States Patent [19]
Smith, Jr.

[11] 3,743,867
[45] July 3, 1973

[54] HIGH VOLTAGE OIL INSULATED AND COOLED ARMATURE WINDINGS

[75] Inventor: Joseph L. Smith, Jr., Concord, Mass.

[73] Assignee: Massachusetts Institute of Technology, Cambridge, Mass.

[22] Filed: Dec. 20, 1971

[21] Appl. No.: 210,088

[52] U.S. Cl. .................................. 310/52, 310/86
[51] Int. Cl. ............................................ H02k 9/00
[58] Field of Search ................... 310/52, 40, 64, 85, 310/86, 54, 53, 58, 55

[56] References Cited
UNITED STATES PATENTS

| | | | |
|---|---|---|---|
| 3,517,231 | 6/1970 | Massar | 310/86 |
| 3,657,580 | 4/1972 | Doyle | 310/52 |
| 3,644,766 | 2/1972 | Hughes | 310/40 |
| 3,242,418 | 3/1966 | Mela | 310/40 |
| 3,368,087 | 2/1968 | Madsen | 310/52 |

*Primary Examiner*—R. Skudy
*Attorney*—Martin M. Santa et al.

[57] ABSTRACT

The armature of a high-voltage electrical generator or motor is contained in a chamber which also contains transformer oil or other suitable insulating and cooling fluid. The oil immerses the armature winding and provides protection against corona and flashover. The oil is also circulated through the chamber and along, across and over the armature conductors including if desired associated structure such as a magnetic shield to provide cooling of the conductors and structure. An oil pump and oil cooler external to the chamber provide a closed oil circulating system.

10 Claims, 2 Drawing Figures

Patented July 3, 1973    3,743,867

HIGH VOLTAGE OIL INSULATED AND COOLED ARMATURE WINDINGS

This invention relates to improving the high voltage insulation of the armature winding of large electrical machines while at the same time providing adequate cooling. This invention is especially applicable to extremely high-voltage machines with superconducting field windings.

In large conventional synchronous machines the armature winding is insulated with plastic, glass and mica flake insulation. Cooling is provided by direct liquid cooling of the stator conductors in these large high-voltage generators. Water is usually employed as the cooling medium and is circulated down the length of the armature conductor and is confined within the armature conductor by connections which are made at both ends of the armature conductor through insulated tubes. The water is used solely for the function of cooling. The voltage of the armature conductors appears across the tubing at the ends of the armature.

Since hydrogen most effectively cools the rotor and the stator iron, with a minimum windage loss, large generators employ a hydrogen atmosphere which also provides additional cooling from the exterior of the armature conductor. Thus, it is necessary to mechanically isolate the water supply in the interior of the conductor from the hydrogen gas on the exterior of the conductor. This form of construction does not overcome the problem produced by charging of the insulation by induction which results in corona loss and the possibility of flashover through the hydrogen to the surrounding iron frame.

The problem of corona discharge will be increased in the more recent designs of electrical machines where output voltage of the order of 100 KV appear practicable as compared with the 30 KV output voltage of conventional machines. These machines will utilize cryogenic or superconducting field windings together with a special winding of the armature to provide the high voltage. A more detailed discussion of such a machine is to be found in the doctoral thesis of James F. Kirtley, Jr., Design and Construction of an Armature for an Alternator with a Superconducting Field Winding, August 1971, a copy of which is in the U.S. Patent Office Scientific Library.

A machine with a superconducting rotor winding will have a rotor design which thermally isolates the rotor from the armature winding. For thermal isolation, an evacuated air gap between the rotor and the armature is most desirable since it provides no windage loss while providing good thermal isolation. Therefore, an air gap fluid, such as hydrogen, is not required to provide cooling of the rotor. The rotor and the armature are each contained within their respective cylindrical enclosures.

This invention provides an armature structure in which oil is used to electrically insulate the armature winding to reduce the corona discharge problem in high voltage windings and in addition, to provide integral cooling by flowing the oil through the armature winding.

The simplest realization of this concept is to contain the armature winding in a fluid-tight annular cylindrical tank. Oil is pumped into one end of this tank, circulates around and through the armature end-turns, passes longitudinally along, through, and across the conductor bars in the active section of the machine, circulates through and around the other armature end-turns, and then flows to the other end of the tank where the oil exits. The oil is externally cooled and returned to the pump suction.

With this oil immersed winding there will be no corona discharges from the end-turns where the corona problem is most severe in conventional machines. The oil filled cooling passages of the armature conductor bar will not be detrimental to the armature insulation, and the terminal bushings for the machines will be less expensive than the gas-to-gas bushings used in conventional machines.

Other objects and features of this invention will be apparent from the following detailed description of the invention considered in conjunction with the following figures.

Figures 1, 2:
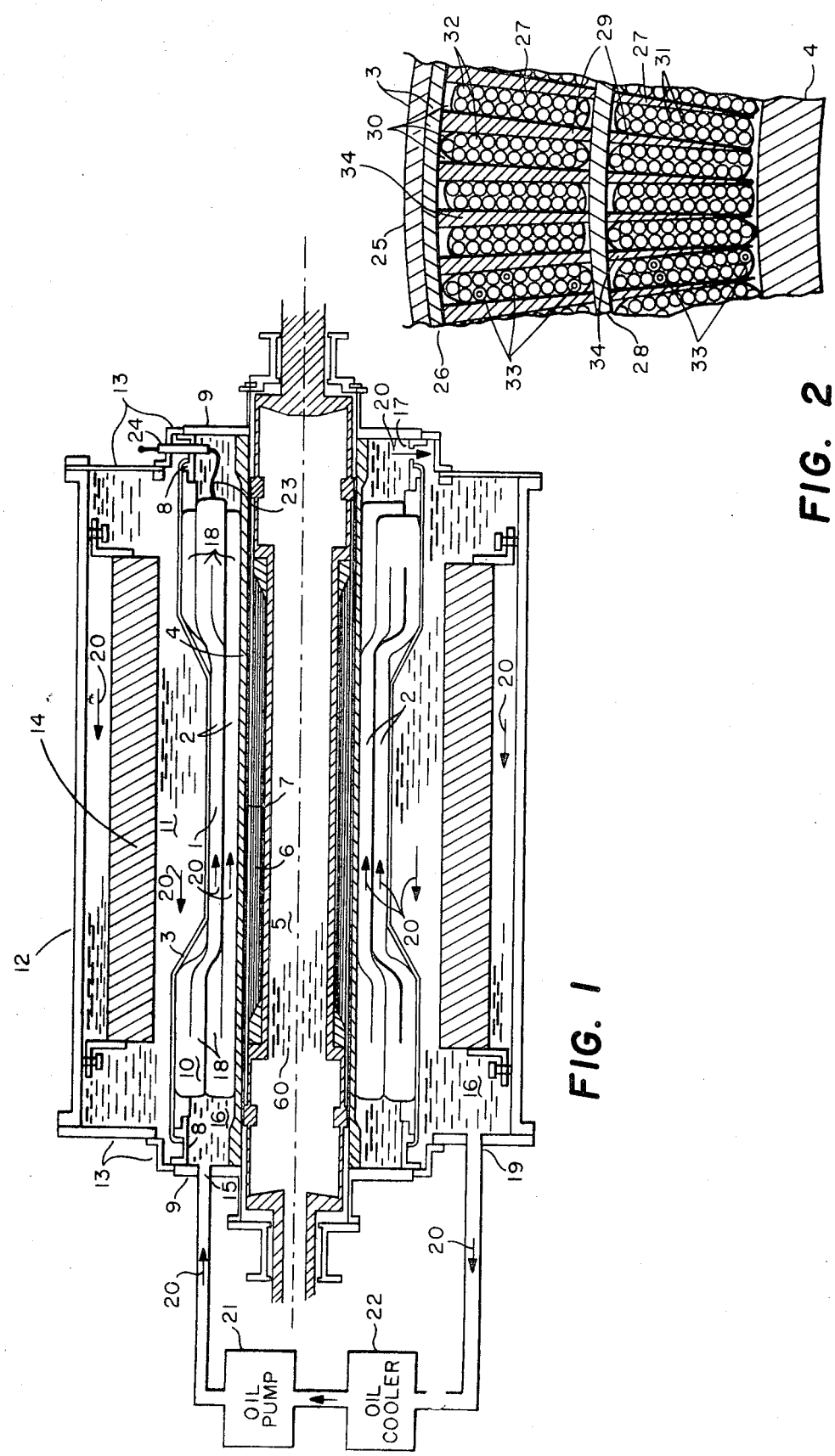
FIG. 1 is a lengthwise cross-sectional view of an armature.
FIG. 2 is a cross-sectional view of a segment of the armature.

A cross-sectional view of an electric generator having a superconducting rotor and an armature incorporating this invention is shown in FIG. 1. The armature 1 has its windings 2 circumferentially enclosed by a cylindrical tube 3. The interior of the armature 1 comprises a phenolic inner shell 4 in the form of a cylinder. The rotor 5, having a superconducting field winding 6, cooled by the cryogenic fluid 60 is separated from the armature winding inner shell 4 by a vacuum space 7. An end flange 8 is attached to the outer tube 3 at each end of the armature. The flange 8 provides a structure by which the armature may be connected to a fixed supporting structure by an end bell 9 which is secured to flanges 8 at both ends of the machine. Suitable gasketing material (not shown) is placed between flange 8 and end bell 9 to form a liquid tight seal. The end bell 9 and the inner tube 4 also have a gasketed liquid tight seal at each end of the armature. Consequently, the armature winding is contained within a cylindrical chamber 10 which is capable of containing a fluid under pressure.

The armature outer shell 3 also forms the inner surface of an outer cylindrical chamber 11. The outer surface 12 of chamber 11 is an aluminum cylinder which provides an eddy current shield to prevent the field from the superconducting rotor 5 from escaping to the exterior of the machine. End closures 13 are connected and gasketed to outer surface 12 and flanges 8 to form the liquid tight chamber 11. A removable iron shield 14 may be contained with this chamber 11 as an alternate form of apparatus for confining the rotor flux within the machine.

The end bell 9 at one end of the armature has an orifice 15 through which the fluid 16 may enter the armature cylindrical chamber 10. The fluid 16 flows longitudinally within chamber 10 to the other end of the armature where the fluid exits chamber 10 through orifice 17 and enters the outer chamber 11. In passing through chamber 10 the fluid 16 both cools and insulates the armature winding end turns 18 and the active region of the armature winding 2. The fluid 16 flows in the opposite longitudinal direction in the outer chamber 11 where it cools the iron shield 14 and for the eddy current shield 12. Fluid 16 exits from chamber 11 through orifice 19 in end closure 13. The flow of fluid 16 through chambers 10, 11 is shown by direction arrows 20. Orifices 15, 19 are connected to an oil pump 21 and oil cooler 22 which connection completes the oil circulation loop.

External electrical connection to the armature winding is made by passing the wire 23 of the end of a phase winding through a bushing 24 which is capable of withstanding the phase voltage and the oil pressure of chamber 10, 11.

A cross sectional view of a section of the armature winding in the central portion of the armature is shown in FIG. 2. The outer tube 3 surrounding the armature comprises a filament-wound glass-epoxy torque tube 25 under which there is a circumferentially wound glass filament-epoxy shell 26. Tubes 25, 26 absorb the radial and torque forces exerted on the armature winding when it is providing current. Two layers of conductor bars 27 are shown to be separated by a shell 28 which is of the same construction as shell 26. The conductor bars 27 in a layer of bars are speparated from one another by phenolic spacers 29. From FIG. 2, a cross sectional view perpendicular to the longitudinal axis of the armature winding, it is seen than any unfilled region 30 between the bars 27 and the outer tube 3 or the inner tube 4 will provide a path for the axial flow of the oil through the armature. It is observed that unfilled spaces 31 between the conductors 32 of a bar also provide a path for oil flow. In addition, the conductors 32 may themselves be formed of twisted strands of wire which will allow oil flow in the space between the twisted wires.

Where the armature conductors and bars are constructed so that the naturally occurring passages for the flow of the cooling fluid as described in the preceding paragraph are not large enough to adequately cool the armature, as would be the case if the armature conductors 32 were of square cross-section, the armature bars 27 may be modified by substituting tubing 33 for one or more of the conductors 32. The tubes 33 would be of the same size as the conductors 32 and would be twisted along with the conductors 32 to form the bar 27. The end-turn connections of the bars would be made in a conventional manner while exercising care to have the tube 33 ends open to fluid contained at each end of chamber 10.

Although the invention has been described in terms of a preferred embodiment of an armature especially suited for use with a cryogenic field winding, it is apparent that the invention need not be limited to this form of armature. In particular a conventional armature capable of producing a sufficiently high voltage to result in a corona and flashover problem may be modified in accordance with this invention. Enclosing the conventional armature winding, including its end turns, in a fluid tight cylindrical enclosure and pumping oil into one end of the enclosure to cause oil flow through the conventional hollow armature bars to the other end of the enclosure would produce the desired insulating effect on the armature end winding in addition to cooling the armature.

Transformer oil would be a suitable fluid to provide the insulating and cooling function desired of the fluid in this invention. However, there exist many other substances in either the gaseous or liquid form well known to those skilled in the art which would provide a suitable fluid. As an example, a material used for insulating pressurized transmission lines, namely sulfahexafluoride, is believed suitable if the fluid chambers are designed to withstand the pressure at which the sulfahexafluoride would be used.

Although the invention has been described with particular reference to specific embodiments, these are to be construed as illustrative only and not as limitations on its scope and spirit which includes variations and modifications within the capabilities of those skilled in the cooling and insulating arts.

What is claimed is:

1. A high voltage electrical machine comprising
an armature winding,
a rotor within said armature winding,
a liquid-tight chamber completely surrounding said armature winding but excluding said rotor,
said chamber having a cylindrical configuration at least in that portion of said chamber interposed between the armature and the rotor,
a fluid contained within and filling said chamber and in contact with the armature winding,
said fluid being electrically insulating and cooling fluid,
means for circulating said fluid within said chamber,
the fluid flow within said chamber flows over the external and/or internal regions of the armature bars of the winding including the end-turn region of the armature winding,
means for cooling said fluid in a closed system,
whereby the armature is cooled and insulated separately from the rotor.

2. The apparatus of claim 1 wherein said fluid is comprised of transformer oil.

3. The apparatus of claim 1 wherein the fluid in contact with the armature winding flows along, across, and over the surface of bars which comprise the armature winding.

4. The apparatus of claim 1 wherein,
the armature winding is comprised of bars having a passage for the flow of fluid along and through the length of the bars which comprise the armature winding.

5. The apparatus of claim 5 wherein,
said bar comprises twisted circular conductors and the passage for the flow of fluid comprises the space between the conductors.

6. The apparatus of claim 6 wherein,
said circular conductors comprise twisted strands of wire having a space between the strands to provide additional passages for the flow of fluid through the armature bar.

7. The apparatus of claim 1 wherein said bar comprises,
a plurality of electrical conductors, each of the same cross section,
at least one tube of the same cross sectional outline,
said conductors and tube being twisted around each other along their lengths to provide the conductor bar,
the tube comprising the passage for the flow of fluid through and along the length of the bar.

8. The apparatus of claim 1 comprising in addition a second chamber connected to the armature chamber by at least one fluid channel,
the second enclosure incorporating a flux shield to be cooled,
said fluid circulating means comprising a fluid pump and a fluid cooler, each enclosure having an orifice to which the pump and cooler are serially connected to allow fluid flow through each enclosure.

9. The apparatus of claim 1 wherein said rotor comprises a cryogenically cooled winding within a cylinder containing the cryogenic fluid, and said rotor cylinder and said armature cylinder being separated by a vacuum space.

10. The apparatus of claim 4 wherein said rotor comprises a winding of superconductors and said cryogenic fluid is at a temperature at which said rotor winding is superconducting.

* * * * *